UNITED STATES PATENT OFFICE.

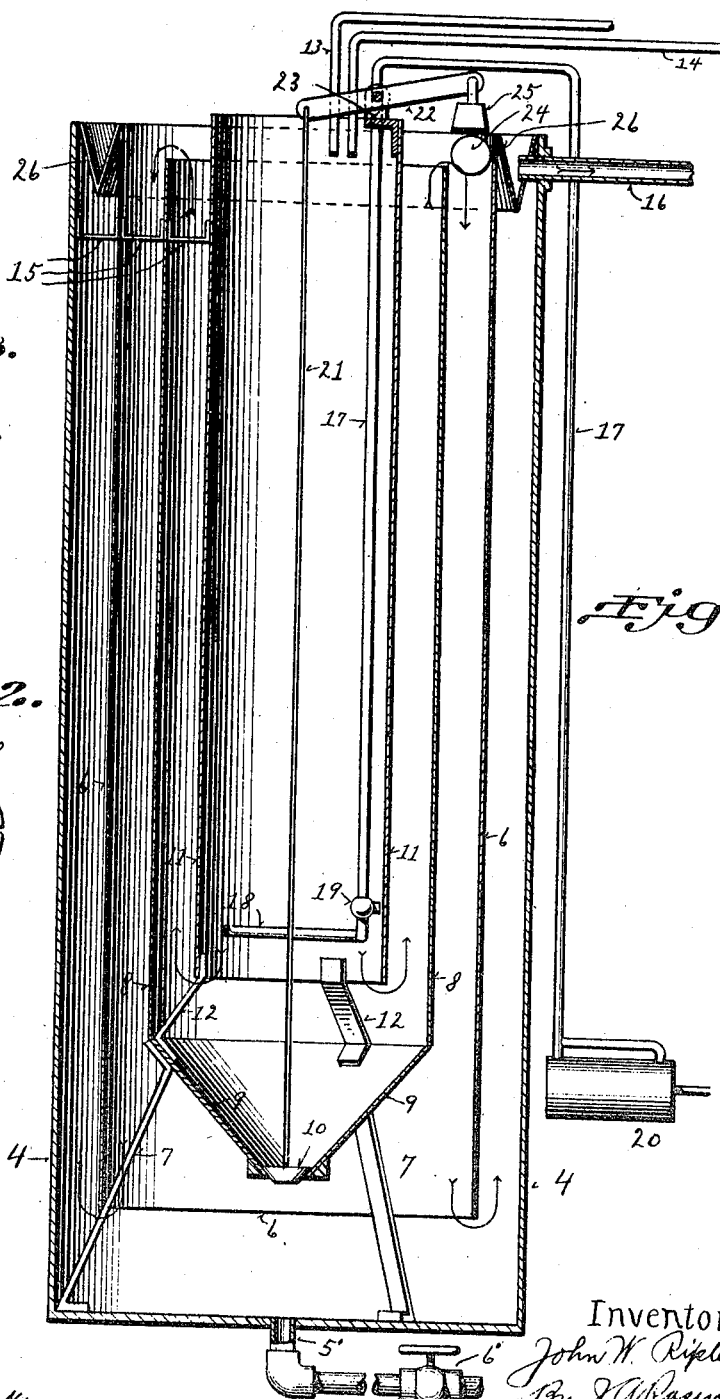

JOHN W. RIPLEY, OF TOPEKA, KANSAS.

WATER-PURIFYING APPARATUS.

1,123,011.  Specification of Letters Patent.  Patented Dec. 29, 1914.

Application filed November 17, 1913. Serial No. 801,415.

*To all whom it may concern:*

Be it known that I, JOHN W. RIPLEY, a citizen of the United States, residing at Topeka, in the county of Shawnee and State of Kansas, have invented certain new and useful Improvements in Water - Purifying Apparatus, of which the following is a specification.

My invention relates to water purifying and treating systems in which the water is purified or treated by introducing thereinto suitable chemicals, agitating the same, permitting the resulting solid substances therein to settle, and drawing off the purified water.

It relates more specially to systems of this kind where the purifying or treating is done on a large scale and where the operation is a continuous one.

It is the object of my invention to simplify the operation and the apparatus used, and to make both the apparatus and the operation more economical; to use air as an agitating agent, and to provide in connection therewith certain further parts making my apparatus more economical, efficient, and convenient.

And my invention comprises a novel apparatus for introducing air as an agitating agent into the lower portion of the innermost or inlet tube and an arrangement of the next tube so that its lower portion serves as a settling chamber.

In the drawings accompanying and forming part of this specification and in the description of the drawings, I have shown my invention in its preferred form and what I deem to be the best mode of applying the principles thereof; but it is to be understood that, within the scope of the appended claims, I contemplate changes in form, proportions, and materials, the transposition of parts, and the substitution of equivalent members, without departing from the spirit of my invention.

Figure 1 is a vertical central sectional elevation of an apparatus made in accordance with the principles of my invention. Fig. 2 is a bottom view of the pipe or spray nozzle from which the air is projected into the water. Fig. 3 is a view showing the composition of the V-shaped filter or strainer used for eliminating the floating particles just before the water finally passes out of the apparatus.

Similar reference characters indicate similar parts throughout the several views.

4 is the main tank, preferably cylindrical in form and set upon end. From its bottom leads a waste pipe 5 provided with a valve 6' normally closed.

6 is a tube of smaller diameter than the main tank and placed within the large tank and concentric therewith. It is supported on brackets 7 with its lower open end somewhat above the bottom of the main tank, so as to form a passage-way from the interior of the tube 6 to the bottom portion of the main tank and to the space between said tube and tank around the bottom of the tube.

8 is a tank of still smaller diameter supported on the brackets 7 and concentric with the main tank, and having a funnel-shaped bottom 9 having at its lower end an opening normally closed by a valve 10. The upper end of this tank or tube is open and is lower than the upper end of the next surrounding tube 6 so as to afford passage-way for the water from the tube or tank 8 to the space between that tube or tank and the tube 6 over the upper end of the tube or tank 8.

11 is a tube of still smaller diameter, located within the tube or tank 8 and concentric therewith, and supported on brackets 12 at its lower open end above the bottom of the tank 8, so as to afford passage around its lower end from its interior to the space between it and the tank or tube 8.

The lower open end of the inlet tube 11 is supported high enough above the funnel-shaped bottom of the tube or tank 8 to permit the lower portion of the tank 8 to serve as a settling basin; that is to say, there is not only room around the lower end of the tube 11 to permit the circulation around under the same, but also room below the end to permit the solid substances in the water to settle to the bottom of tank 8 and to remain there without agitation by the current until such sediment is drawn off through the valve 10.

13 and 14 are the feed pipes for introducing into the upper end of the last-described, the innermost, tube the raw water to be purified or treated and the chemicals, reagent, or other preparation.

Suitable braces or brackets are represented by the numeral 15.

16 is the outlet pipe leading from the upper end of the main tank, and adapted to draw the water from the space between the main tank and the next inner tube 6.

17 is a pipe adapted to convey air from a source of supply, as a compressor 20, to the lower portion of the innermost tube 11, where the pipe is formed preferably in a circle 18 with perforations in its bottom side through which the air is projected into said tube, said perforations being in the bottom side to avoid their filling with sediment which might occur if they were in the upper side. 19 is a check valve to prevent the pipe from filling with water when the pressure is released.

The spray or projecting nozzle 18 is located above the lower end of the tube 11, and high enough thereabove so that the air projected therefrom does not enter the settling basin formed by the lower end of the tank 8, so as not to agitate the sediment therein, or prevent the settling of the same therein.

The valve 10 is connected by means of a rod or other suitable connecting link 21 with one end of a lever 22 fulcrumed on a bracket 23 secured to any suitable portion of the apparatus as to the upper end of one of the tubes. To the other end of the lever is connected a float 24 and a counterweight 25, the float being located so as to float in the water outside of the tube or tank 8; these parts being so adjusted that under normal operation of the apparatus the float is held at sufficient height by the water to keep the valve closed; but when the height of the outside water is reduced, as by opening the valve 6, the float and counterweight will also come down and thus raise and open the valve 10.

26 is an annular V-shaped filter or strainer let down into the upper end of the space between the main tank and the next inner tube 6; it is composed of a wire netting 28 for holding its shape, a coarse-meshed fabric 27 on its inflow side and a finer fabric 29 on its outflow side. The use of this filter is optional, its purpose being to eliminate from the final product such floating particles as have not been precipitated. When it is used, the outlet pipe 16 leads from the upper portion of the filter, so that all the water must finally pass through the filter before entering the outlet pipe 16.

When the apparatus is empty, the valve 10 is open. Said valve will remain open until the water, which during the filling process has free passage between all the compartments, reaches a uniform level above the upper end of tube or tank 8, and then the raising of the float closes said valve. The level just described is the normal working level, and the valve 10 is thus normally maintained closed. Now, with both valves 6' and 10 closed, with the raw water being fed into the upper end of the innermost tube 11, and the water flowing out through the outlet pipe 16, air is continuously forced into the lower portion of the said innermost tube through pipe 17 and spray-nozzle 18, and such air rising through the water in such tube causes the same to be greatly agitated, thereby producing the necessary thorough mixing of the raw water and the chemicals which are fed continuously with the raw water.

The flow of the water, the circulation, is indicated by the arrows. The current passes from the top of the innermost tube to the bottom thereof, thence around the bottom or lower end and up through the space between that tube and the tank 8, thence over the upper end of that tank and down through the space between that tank and the next tube 6, thence around the bottom of the last-named tube and up through the space between that tube and the main tank, thence through the filter, and thence out through the outlet pipe 16.

A large portion of the solids which form as a result of the treatment will be deposited in the funnel-shaped bottom 9 of the tank 8, and the remaining portion will be deposited in the bottom of the main tank.

It will be understood that the flow through the tank is exceedingly slow, thus giving ample time and opportunity and favorable conditions for the solid particles to settle. Furthermore, by introducing the additional down and up circulation, I am able to give as much circulation as would be required in a tank of approximately double height where there is but a single down and up circulation.

To draw off the sediment, the valve 6' is opened. At first only the contents of the bottom of the main tank and of the outer two passages flows out; but upon reducing the level, the lowering of the float opens the valve 10, which permits the sediment and water from the inner tank 8 to flow out. If it were not for this arrangement, the tank 8 might be left with its contained water at a much higher level than the water surrounding it, which would cause a proportionately increased strain on its bottom and walls. But by this valve releasing means, I can so adjust that the upper levels of the contents in the compartments will be approximately the same, except indeed for the slight difference necessary to operate the valve 10. And thus the pressure is equalized on both sides of the tank 8; and obviously it is equalized on both sides of each of the tubes. These inner tubes and the tank 8 may, therefore, be made of very thin or light material, they serving rather as mere partitions than as containers, and the pressure of the water is exerted only against the bottom and walls of the main tank 4, which, as clearly shown, should be sufficiently substantial.

It will thus be seen that, with a given amount of circulation I have been able not only to reduce the height of the tank, but have made the apparatus more compact, and more economical in construction. Also by introducing air into the lower portion of the innermost tube to effect the agitation, I do away with cumbersome and expensive mechanical mixers and at the same time obtain a most thorough agitation in a continuous operation.

What I claim is:

1. The combination of a cylindrical tank set upon end and having a funnel-shaped bottom and an outlet opening at its lowest extremity, and having also an outlet opening at its upper end, a valve in the first-named opening, an inlet tube open at its bottom, of smaller diameter than said tank and set upon end within and concentric with said tank, the walls of the tank and tube being spaced apart from each other and forming a water passage, suitable supports supporting said tube above said funnel-shaped bottom with the lower end of the tube spaced apart from said funnel-shaped bottom and leaving space therebelow to form a settling basin in said funnel-shaped bottom, an air pipe leading into said inlet tube and terminating in an annular air-projecting nozzle having perforations through its lower wall, said nozzle being located in the lower portion of said tube and above the bottom thereof, and a check valve in said air pipe adjacent to said nozzle.

2. The combination of a cylindrical tank set upon end and having a funnel-shaped settling basin in its bottom and an outlet opening through its lowest extremity and having also an outlet opening at its upper end, a valve in said first-named opening, a cylindrical inlet tube open at both ends and of smaller diameter than the tank and set upon end within and concentric with the tank, the tank and tube being spaced apart as to their side walls to form a water passage therebetween, supporting devices supporting said tube with its lower open end above said settling basin, an air pipe leading into the lower portion of the tube and terminating in an annular horizontally disposed projecting nozzle above the lower end of the tube, said nozzle having perforations in its lower side, and a check valve in said air pipe adjacent said nozzle.

3. The combination of a cylindrical tank set upon end and formed with a funnel-shaped settling basin in its bottom, and having a water outlet at its top and a sediment outlet at its extreme bottom, a valve in said sediment outlet, an inlet tube open at both ends and set upon end within and concentric with the tank, the walls of the tank and the tube being spaced apart from each other to form a water passage, brackets supporting said tube with its lower end above the settling basin, an air pipe leading into and terminating in the lower portion of the tube and above the bottom thereof in an air projecting nozzle, means for introducing water and chemicals into the upper end of said inlet tube and means for supplying compressed air to said air pipe.

4. The combination of a tank formed with a settling basin in its bottom and having an opening at the top and a sediment outlet opening at its extreme bottom, a valve in said sediment outlet opening, an inlet tube open at its upper and lower ends, means for supporting said tube within the tank with the bottom of the tube above the settling basin, the side walls of the tank and tube being spaced apart from each other to form passage for the water, an air pipe leading into and terminating in an air projecting nozzle in the lower portion of said tube above the bottom thereof, means for supplying water and chemicals to the upper end of said tube, and means for supplying compressed air to the air pipe.

5. The combination of a tank formed with a settling basin in its bottom and having a water outlet at its top and a sediment outlet at its extreme bottom, a valve in said sediment outlet, an inlet tube that is open at its lower end, means for supporting said tube with its lower open end above said settling basin and within the tank, the side walls of the tube and tank being spaced apart from each other to form a water passage, an air pipe leading into and terminating in an air projecting nozzle in the lower portion of said tube above the lower open end thereof, means for supplying water and chemicals to the upper end of the tube, and means for projecting an air blast through said nozzle.

In testimony whereof I have affixed my signature in presence of two witnesses.

JOHN W. RIPLEY.

Witnesses:
C. J. ROSEN,
J. M. STARK.